(12) United States Patent
Villette et al.

(10) Patent No.: US 10,900,614 B1
(45) Date of Patent: Jan. 26, 2021

(54) APPARATUS, SYSTEM AND METHOD FOR INCREASING FRICTION BETWEEN A CABLE AND SURROUNDING SOIL

(71) Applicant: Saudi Arabian Oil Company, Dhahran (SA)

(72) Inventors: Thibault Villette, Dhahran (SA); Waheed Alrafaei, Chester (GB); Iqbal Hussain, Birmingham (GB)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/687,244

(22) Filed: Nov. 18, 2019

Related U.S. Application Data

(63) Continuation-in-part of application No. 16/667,541, filed on Oct. 29, 2019, now Pat. No. 10,760,244.

(51) Int. Cl.
| | |
|---|---|
| *F16L 1/032* | (2006.01) |
| *F16L 1/11* | (2006.01) |
| *F16L 57/00* | (2006.01) |
| *H02G 9/02* | (2006.01) |
| *F17D 5/00* | (2006.01) |
| *F16L 1/028* | (2006.01) |
| *E02F 5/10* | (2006.01) |

(Continued)

(52) U.S. Cl.
CPC ............... *F17D 5/00* (2013.01); *F16L 1/028* (2013.01); *F16L 1/032* (2013.01); *F16L 1/11* (2013.01); *F16L 57/00* (2013.01); *H02G 9/02* (2013.01); *E02F 5/10* (2013.01); *G02B 6/504* (2013.01); *H02G 9/00* (2013.01)

(58) Field of Classification Search
CPC ... F16L 1/028; F16L 1/032; F16L 1/11; F16L 3/26; F16L 7/00; F16L 57/00; H02G 9/02; H02G 9/06
USPC .......... 405/157, 184.4; 174/68.1, 68.3, 72 A, 174/74 R, 79, 70 C, 135, 138 R
See application file for complete search history.

(56) References Cited

U.S. PATENT DOCUMENTS

| | | | |
|---|---|---|---|
| 3,362,115 A | * | 1/1968 | Nyhus ..................... E04H 12/20 52/101 |
| 3,699,693 A | | 10/1972 | Nelkin et al. |

(Continued)

FOREIGN PATENT DOCUMENTS

| | | | |
|---|---|---|---|
| CN | 204217330 A1 | 3/2015 | |
| CN | 108419548 A | 8/2018 | |
| WO | WO-2013136164 A2 * | 9/2013 | ............... H01B 3/44 |

*Primary Examiner* — Frederick L Lagman
(74) *Attorney, Agent, or Firm* — Leason Ellis LLP

(57) ABSTRACT

A system and method for increasing friction between cables and surrounding soil is disclosed. In particular, a cable apparatus for use in a sub-surface protective network of intertwined cables is provided which comprises an elongate reinforced polymer cable body having a length. The cable apparatus also includes a plurality of elongate barbs provided along the length of the cable body. The barbs extend from the cable body to a respective free end in both a lengthwise direction and radially. Additionally, the barbs are spaced apart in one or more of the lengthwise direction along the length of the cable body and circumferentially about the cable body. Moreover, according to a further aspect, a plurality of such cables can be provided underground and intertwined to define a protective network cables for protecting buried assets.

18 Claims, 17 Drawing Sheets

(51) Int. Cl.
*H02G 9/00* (2006.01)
*G02B 6/50* (2006.01)

(56) References Cited

U.S. PATENT DOCUMENTS

| | | | | |
|---|---|---|---|---|
| 4,309,072 A | * | 1/1982 | Tweeddale | G02B 6/443 |
| | | | | 119/57.9 |
| 4,661,018 A | | 4/1987 | Kinnan | |
| 4,815,896 A | * | 3/1989 | Fox | F16L 1/123 |
| | | | | 174/136 |
| 4,844,422 A | | 7/1989 | Major | |
| 5,397,355 A | | 3/1995 | Marin et al. | |
| 5,981,876 A | * | 11/1999 | Fukui | E04C 5/10 |
| | | | | 174/106 D |
| 6,182,706 B1 | * | 2/2001 | Tako | F16L 7/00 |
| | | | | 138/151 |
| 6,226,933 B1 | * | 5/2001 | Nelson | A01G 13/10 |
| | | | | 43/124 |
| 6,519,901 B1 | * | 2/2003 | Nelson | A01G 13/10 |
| | | | | 340/539.22 |
| 7,450,805 B2 | * | 11/2008 | Park | G02B 6/4438 |
| | | | | 385/100 |
| 8,359,791 B1 | * | 1/2013 | Nixon | A01M 29/32 |
| | | | | 119/537 |
| 9,107,350 B2 | * | 8/2015 | Shields | A01G 9/02 |
| 9,340,339 B2 | | 5/2016 | Magno, Jr. et al. | |
| 2001/0011602 A1 | * | 8/2001 | Vitolo | H01B 7/184 |
| | | | | 174/117 R |
| 2002/0136509 A1 | | 9/2002 | Watson | |
| 2004/0120773 A1 | * | 6/2004 | Li | H04J 3/0632 |
| | | | | 405/184.4 |
| 2004/0165957 A1 | * | 8/2004 | Serrano | G02B 6/504 |
| | | | | 405/157 |
| 2005/0103518 A1 | * | 5/2005 | Glew | G02B 6/4489 |
| | | | | 174/113 R |
| 2005/0133246 A1 | * | 6/2005 | Parke | H01B 11/04 |
| | | | | 174/113 R |
| 2006/0032660 A1 | * | 2/2006 | Parke | H01B 7/184 |
| | | | | 174/113 R |
| 2009/0266581 A1 | * | 10/2009 | Schorr, III | H01B 7/009 |
| | | | | 174/135 |
| 2016/0054531 A1 | * | 2/2016 | Baca | G02B 6/443 |
| | | | | 385/110 |

* cited by examiner

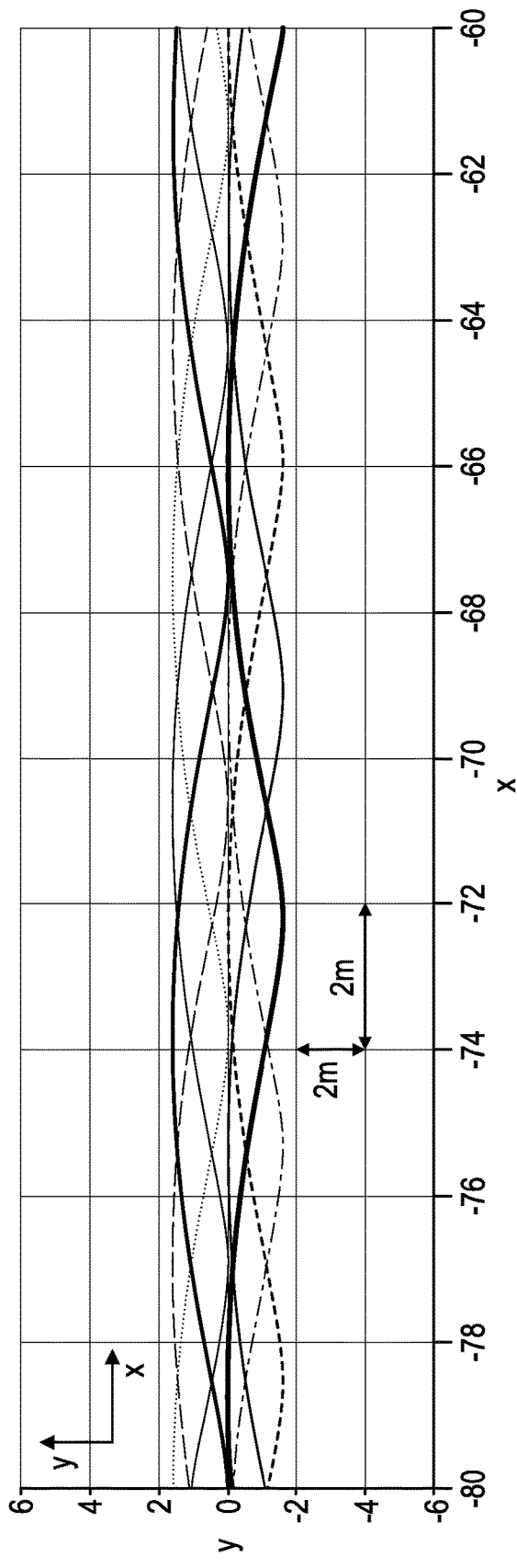
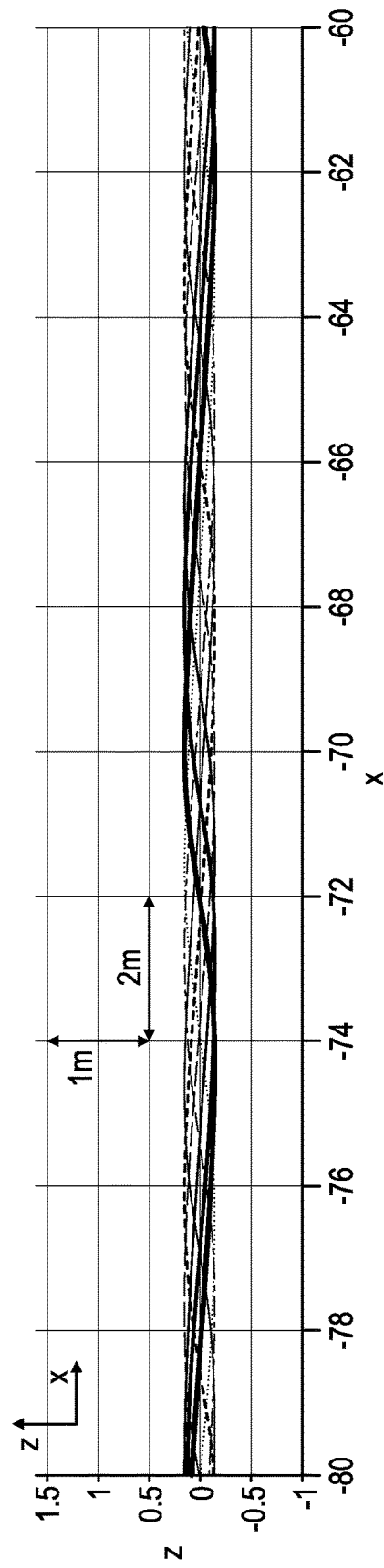
FIG. 9B
FIG. 9C

APPARATUS, SYSTEM AND METHOD FOR INCREASING FRICTION BETWEEN A CABLE AND SURROUNDING SOIL

CROSS-REFERENCE TO RELATED APPLICATION

The present application is a continuation in part of U.S. application Ser. No. 16/667,541, titled SYSTEM AND METHOD FOR SUBSURFACE CABLE INSERTION FOR THE PROTECTION OF UNDERGROUND ASSETS, filed on Oct. 29, 2019 with the U.S. Patent and Trademark Office, the entire contents of which is hereby incorporated by reference as if set forth in its entirety herein.

FIELD OF THE DISCLOSURE

The present disclosure is directed to subsurface cable structures. In one particular arrangement, the present disclosure describes a system for increasing friction between a cable and the surrounding soil and between overlapping cables within a subsurface cable network.

BACKGROUND OF THE DISCLOSURE

The security and safety around underground infrastructures, such as oil and gas transportation pipelines, has become an important endeavor. Many studies show that most damage to pipelines is third-party damage, which refers to damage caused by earth working (e.g., using a digger or excavator) in the vicinity of an existing pipeline, which is insufficiently spotted or insufficiently protected. The Pipeline Research Council International (PRCI) studies on gas pipelines indicated that 40% of pipeline damage incidents are caused by third-party damage.

A high percentage of failures can be attributed to encroachment and this increasing trend is expected to increase as remote areas become urbanized. This is due to the fact that increases in the population and urbanization lead to an increase in development activities including construction and thus increasing the likelihood of third-party damages. Pipeline failure frequencies in developed areas are four (4) times that in rural areas.

Today, concrete is used for the protection of buried pipelines. Pre-fabricated or casted on-site, concretes slabs are attractive because of their robustness and availability of the material. However, concrete slabs are heavy which implies constraints on the necessary devices (cranes, trucks) and on employees operating the protection, as slab handling is risky and requires a minimal number of operators. Another drawback is the difficulty in handling concrete slabs during construction as well as maintenance operation.

Polymer slabs provide a number of advantages compared to concrete slabs. In particular, the weight of polymer slabs is significantly less for an equivalent surface of protection. This lightweight advantage leads to saving cost. Polymer slabs offer increased functionality as well. Installation of polymer slabs and concrete slabs, however, requires digging of a trench, wherein the width of the trench is driven by the pipeline diameter. Typically, the width of the trench will range between one to two meters. After digging the trench, the slabs are installed followed by backfilling the trench.

One alternative to polymer slabs is installation of polymer meshes that resemble woven netting. Although the mesh solution is less resistant than the HDPE slab, a mesh can withstand, for example, a force equal to 210,000N, which is in general sufficiently robust to protect subsurface structures. Protecting subsurface infrastructure with a mesh, however, requires burying a larger mesh than a slab. This is due to the flexibility of the mesh which is compensated through leveraging a larger friction surface between the protection layer and the soil. Hence, the installation of a mesh requires digging of a wider trench than for polymer slabs.

SUMMARY OF THE DISCLOSURE

According to an aspect of the present disclosure, there is provided a cable apparatus for use in a protective network of intertwined cables provided beneath a surface of ground. The cable apparatus comprises an elongate reinforced polymer cable body having a length. Additionally, the cable apparatus comprises a plurality of elongate barbs provided along the length of the cable body. In particular, the barbs extend from the cable body to a respective free end in both a lengthwise direction and radially. Additionally, the barbs are spaced apart in one or more of the lengthwise direction along the length of the cable body and circumferentially about the cable body.

According to a further aspect of the present disclosure, there is provided a protective cable system provided beneath a surface of ground. The system comprises a plurality of intertwined cables. Each of the cables includes an elongate reinforced polymer cable body having a length and a plurality of elongate barbs provided along the length of the cable body. In particular, the barbs extend from the cable body to a respective free end in both a lengthwise direction and radially. Additionally, the barbs are spaced apart in one or more of the lengthwise direction along the length of the cable body and circumferentially about the cable body.

According to a further aspect of the present disclosure, there is provided a method of constructing a cable apparatus for use in a protective network of intertwined cables, which are provided beneath a surface of ground. In particular, the method includes the step of providing an elongate reinforced polymer cable body having a length. The method further includes providing a plurality of elongate barbs along the length of the cable body. In particular, each barb extends from the cable body to a respective free end in a lengthwise direction and radially. Moreover, the barbs are provided at respective position such that the barbs are spaced apart in one or more of the lengthwise direction along the length of the cable body and circumferentially about the cable body.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

FIGS. 9A-9C are charts graphically illustrating the respective position of cables within a cable network deployed using an exemplary set of system parameters according to an embodiment;

DESCRIPTION OF CERTAIN EMBODIMENTS OF THE DISCLOSURE

Figure 1:
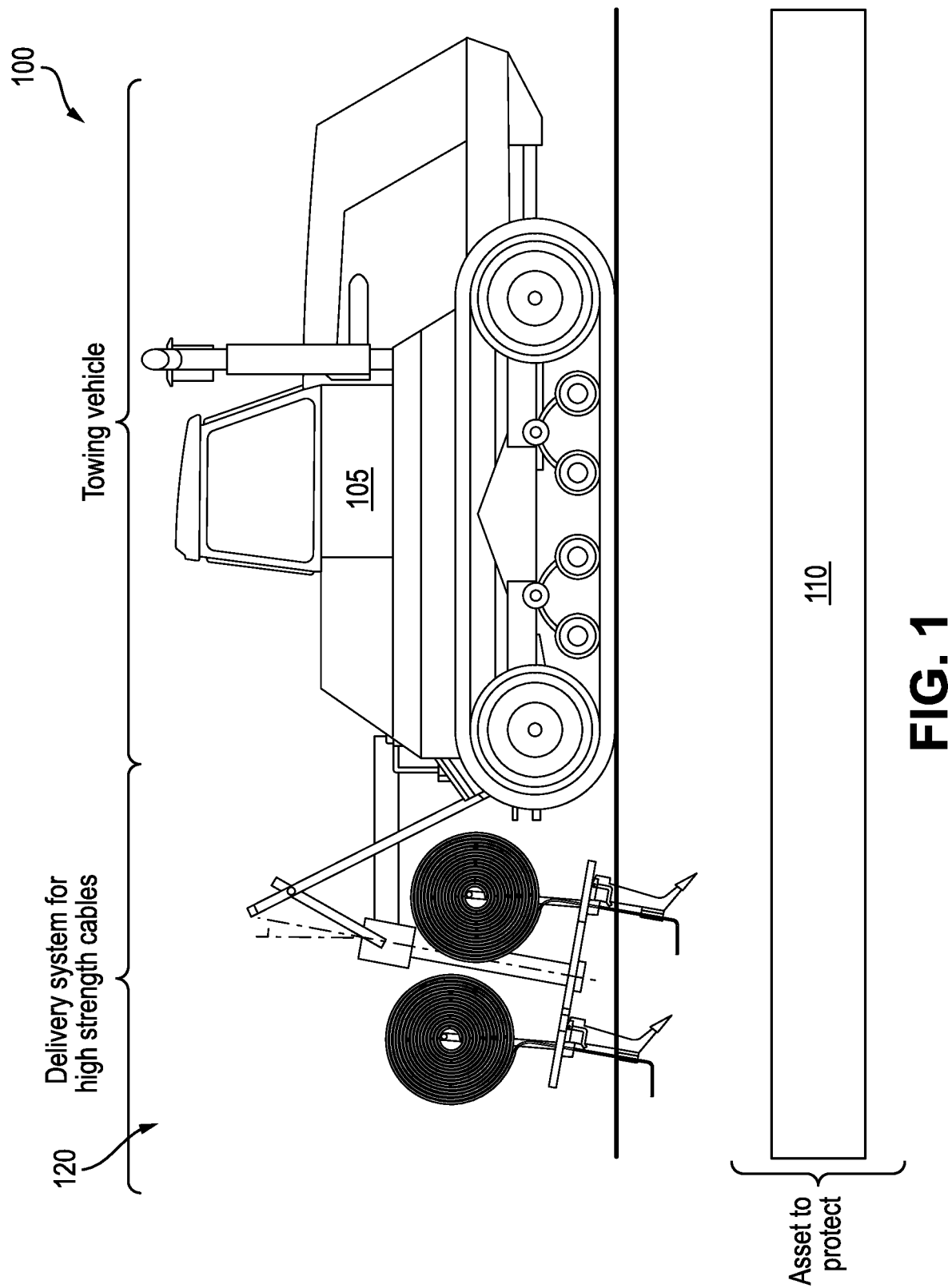
FIG. 1 is a high-level diagram illustrating an exemplary configuration of a subsurface cable insertion system for protecting buried infrastructures according to an embodiment.

By way of overview and introduction, the present application describes devices and methods relating to constructing an underground protection structure for protecting buried assets from accidental damage caused by, for example, an excavator or other such earth working machinery.

Conventional methods for protecting underground assets, such as such as pipelines, electric cabling or fiber optics, includes digging a trench and then laying down protective concrete slabs, polymer slabs or pre-woven polymer mesh blankets. These approaches require significant digging, removal of earth from the area where the protective slabs or blankets are to be installed and then backfilling the earth over the protective structures. As a result, these existing approaches can be labor intensive and costly. Given the drawbacks of existing systems for protecting underground assets, what is needed are protective systems that are more efficiently installed and configured. It is with respect to these considerations that the embodiments herein are disclosed.

The embodiments disclosed herein include systems and methods for trenchless delivery of a protective network of intertwined high-strength polymer cables as well as the resulting underground protection system comprising the protective cable network. The system includes a subsoil delivery apparatus (also referred to as a "subsoil intertwiner"), which can be towed behind a vehicle such as a tractor, and which delivers the cables at a depth under the soil surface and intertwines the cables to form the protective cable network. The systems and methods for installing the cable network and the installed protective cable network itself, as further described herein, provide beneficial and innovative characteristics over existing approaches for protecting underground assets from damage including that the system does not require opening or back-filing a trench. Moreover, the protective properties of the delivered underground protection network can be adapted to application requirements—such as by selectively tuning properties including cable network density, number of physical cable-cable entanglements—and be controlled by the set-up and operational parameters of the delivery system. The protection system described herein minimizes material costs for cable protection. For instance, instead of delivering slabs, the system comprises reinforced ropes or cables and thus requires significantly less material, thereby minimizing costs. Moreover, the protection network can be composed of commercially available cables and, as such, there is no need to manufacture specific equipment such as slab, or mesh. Further, the risks of disrupting cathodic protection of buried pipelines is significantly decreased as the polymer cables defining the cable network are not reinforced with metal and are spaced apart, which better allows the soil's structure to keep continuous conductive properties in the Z direction (which refers to the direction that is normal to the ground surface or vertical direction).

Figure 2A:
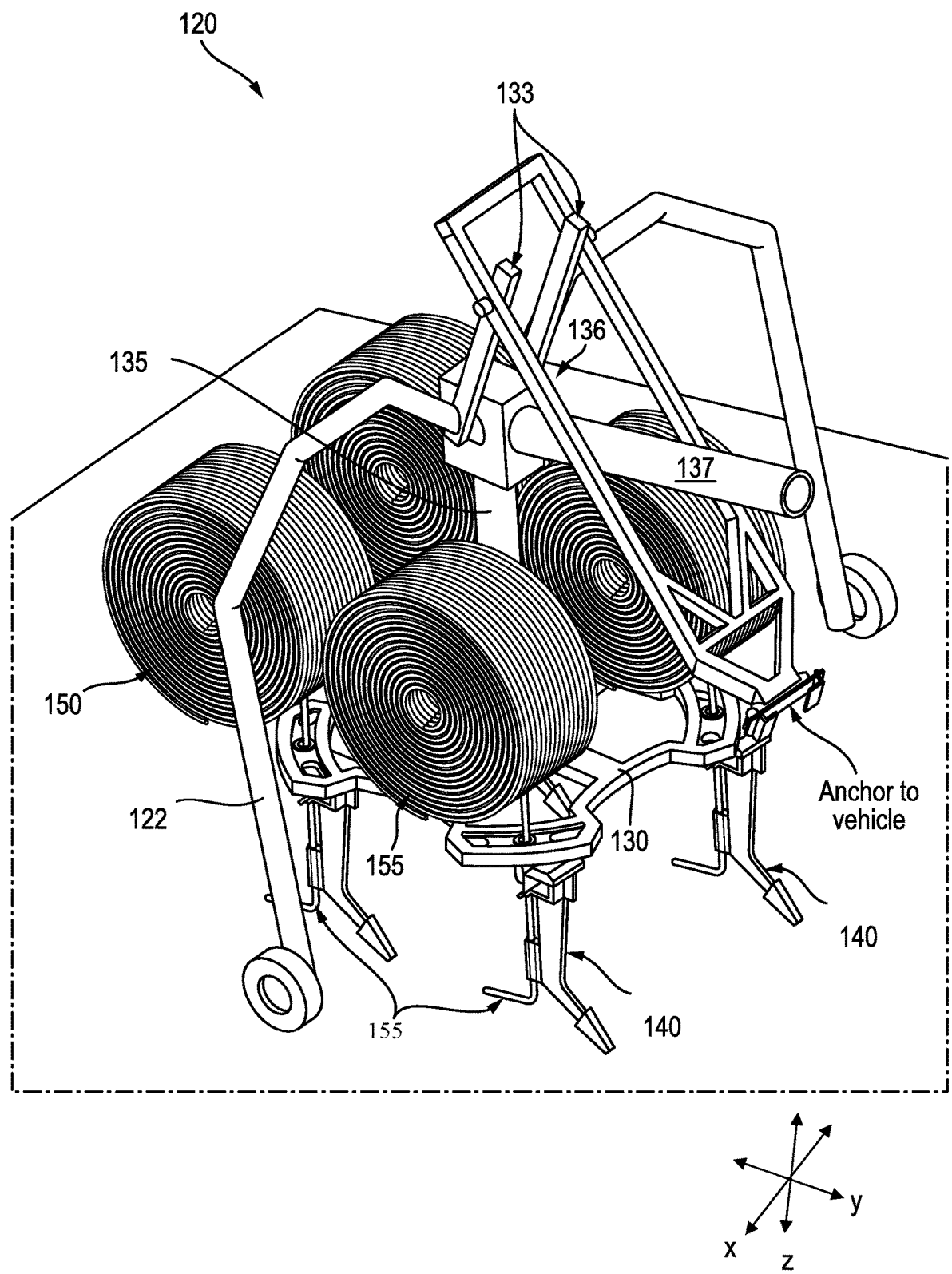
FIG. 2A is a perspective view diagram of an exemplary apparatus for subsurface cable insertion according to an embodiment.

FIG. 1 is a high-level diagram illustrating an exemplary configuration of a subsurface cable insertion system configured to deliver a protective network of intertwined cables according to an embodiment. FIG. 1 shows a lateral view of the system 100 including the towing vehicle 105, such as a tractor, for towing the subsoil intertwiner 120 as well as the underground asset 110 to be protected. FIGS. 2-3 also depict a perspective view and side view, respectively, of the exemplary subsoil intertwiner 120.

A rotating carrier 130 is the central component of subsoil intertwiner 120 and is shown in greater detail in FIG. 2-FIG. 3. As shown, the rotating carrier can be supported by a chassis that can include, for example, one or more stabilizing members 122 suitable for being pulled along behind the vehicle and maintaining the rotating carrier in position during operation. The rotating carrier supports a plurality of soil rippers 140 located below the rotating carrier. The system further includes spool carriers 150 which carry cable spools of cable 155 inserted into the ground by respective soil rippers. As shown, each spool carrier is rigidly connected to the carrier or respective soil ripper, although other spool carrier configurations can be implemented. In one or more embodiment, it can be preferable to use high strength polyethylene cables such as Dyneema® 2 cm diameter cables. Dyneema® is an UHMwPE (Ultra High Molecular weight Polyethylene) or HMPE (High Modulus Polyethylene) fiber developed by Royal DSM N.V (Netherlands). These cables (or ropes) for example have a maximum strength of 333,000 N which means this type of cable can withstand a tensile force of 33 tons. Alternative cables can be used depending on the intended application.

The rotating carrier 130 is configured to support at least two soil rippers. In the embodiment shown in FIG. 1-2B, the rotating carrier supports four rippers 140 located at respective radial positions on the rotating carrier. As a result, a single rotating carrier can establish an intertwined cable network having a maximum width that corresponds to the maximum spacing between at least two rippers. Each soil ripper 140 is mounted to the carrier near a top-end of the ripper and extends away from the carrier down toward the ground in the vertical direction, which refers to the direction that is generally perpendicular to the ground surface and the direction of forward travel. It should be understood that the term ripper is intended to refer to any soil ripping or plow-like device suitable for penetrating the ground to a suitable depth and plowing through the ground so as to incrementally feed out cable beneath the soil surface directly and without removing the soil. Preferably, the ripper is shaped such that it provides suitable ground ripping and cable deploying functionality and such that the ripper passively maintains a proper orientation for deploying cable irrespective of the rotational motion of the carrier. For example, rippers having a fin shape could be utilized that passively maintain the ripper generally in alignment with the vehicle's forward travel direction despite the rotating carrier moving the ripper from side to side as further described herein.

Figure 4A:
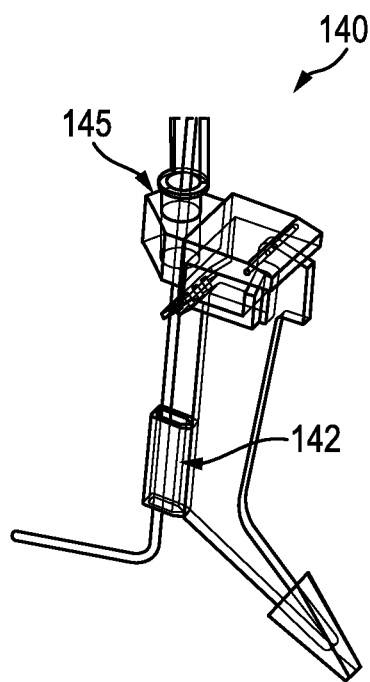
FIG. 4A is a perspective view diagram of an exemplary soil ripper cable delivery device for subsoil delivery of one cable according to an embodiment.

Each soil ripper 140 is equipped with one or more guides 142 that allow cables to be fed from the cable supply spool 150, which is positioned near the top-end of the ripper, down through the guide and out behind the ripper at a depth underground. According to a salient aspect of the proposed invention, the rippers are rotatably mounted to the rotating carrier by, for example, a cylinder/cylinder mount connection 145, thereby providing rotational freedom for each ripper. In the exemplary embodiment, the rippers have no axial freedom relative to the carrier 130. As such, as the rotating carrier rotates 130, each soil ripper follows the rotation while remaining parallel to the vehicle's direction of travel. This facilitates ripping. FIG. 4A illustrates the exemplary soil ripper 140 having a single guide 142 for feeding a single cable. FIG. 4A also illustrates the exemplary cylinder-cylinder connection 145 for rotatably connecting the ripper to the carrier 130. As would be understood, various mount configurations, such as bearings or bushings, can be used to mount the ripper to the carrier to and provide the ripper with at least a minimum degree of rotational freedom suitable for maintaining the ripper in a preferred alignment relative to the general direction of vehicle travel and irrespective of the rotation of the carrier.

Figure 2B:
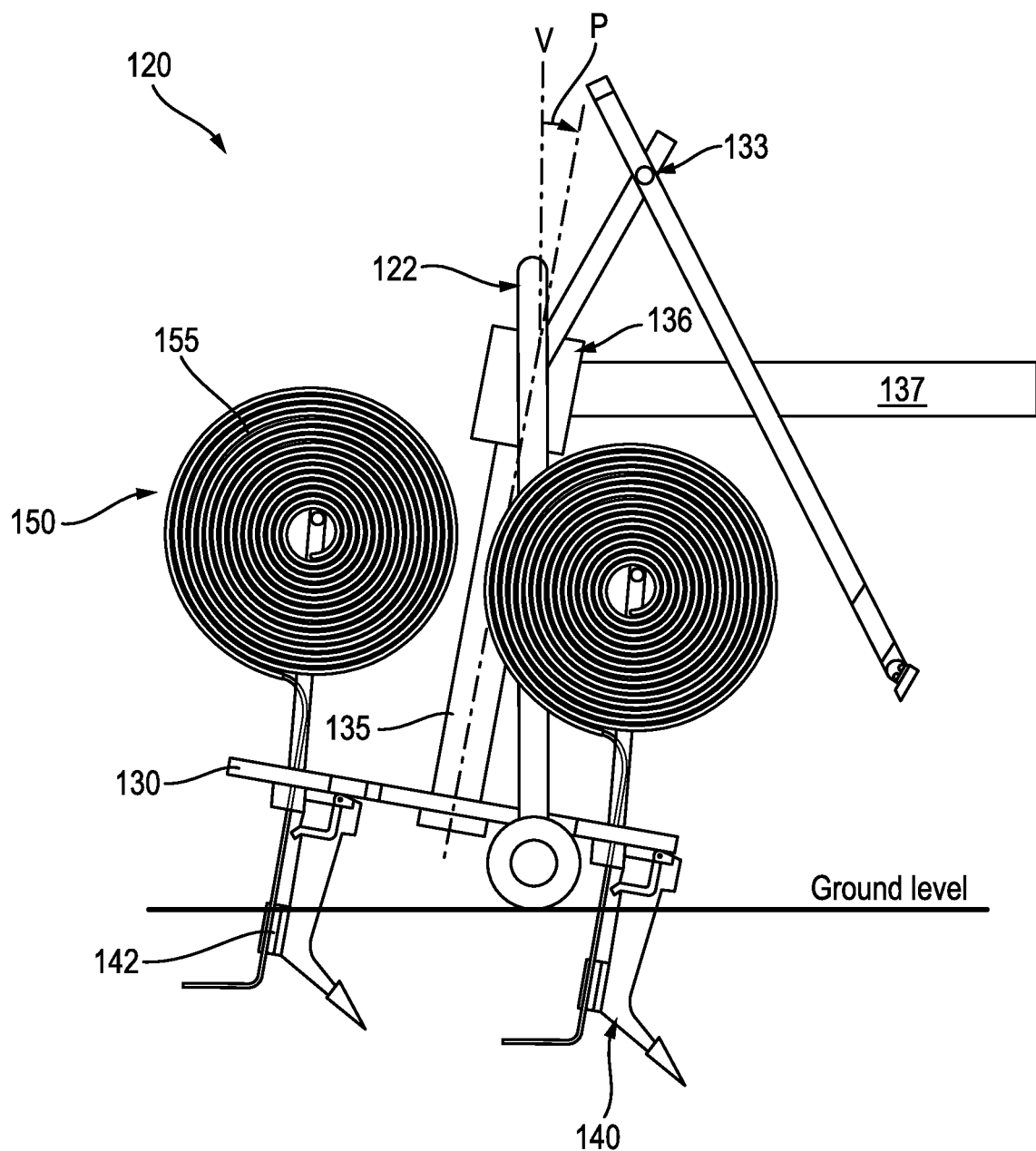
FIG. 2B is a side view diagram of the exemplary apparatus for subsurface cable insertion of FIG. 2.

Returning to FIGS. 1-2B, the rotating carrier 130 rotates around the axis defined by a rotating shaft 135. The rotation is forced though a power transmission unit 136, which as shown in FIGS. 1-2B, includes system of mechanical power transmission shafts 137 for receiving power from the towing vehicle and transferring that power into rotation of the rotating shaft 135 and carrier 130. As would be understood, the power transmission unit can include other or additional known power transmission components that are commonly used in vehicles or heavy equipment for controlling and transferring mechanical power, such as gears, belt drives, shafts, joints, clutches, motors, speed controllers and the like.

The subsoil intertwiner 120 can be configured such that the angle of the rotating shaft, p, (also the axis of rotation for the carrier 130) with respect to the vertical axis, v, can be controllably varied to define a "penetration angle," p, having an angle between 10 and 45 degrees, for example. As shown, the rotating carrier 130 is a generally planar structure and the height and angle of the carrier 130 and the plane of rotation for the carrier and supported rippers relative to the ground can be controllably adjusted using a lever/linkage system 133 connected to the vehicle 105 and the chassis/stabilizer 122.

In operation, the combination of the vehicle movement in the direction of travel and the rotation of the rotating carrier whilst feeding out the cables via the rippers 140 serves to place an underground pattern of intertwined cables. The axis of rotation for the rotating shaft (also referred to as the penetration angle, p) can be varied from the vertical axis, v, which allows the cables to entangle and results in the sub-surface deployment of an intertwined network of cables, as further described below in connection with FIG. 5A.

Figure 4B:
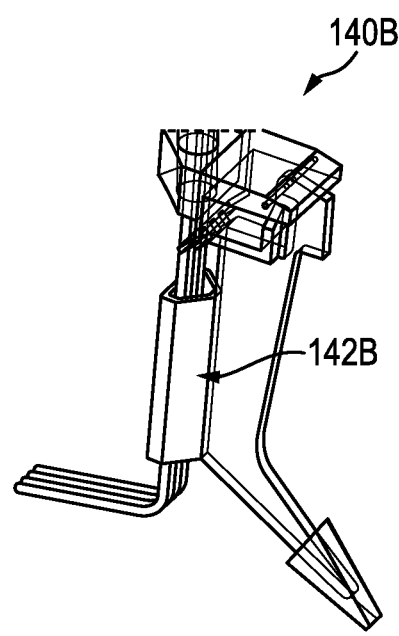
FIG. 4B is a perspective view diagram of an exemplary soil ripper cable delivery device for subsoil delivery of four grouped cables according to an embodiment.
Figure 4C:
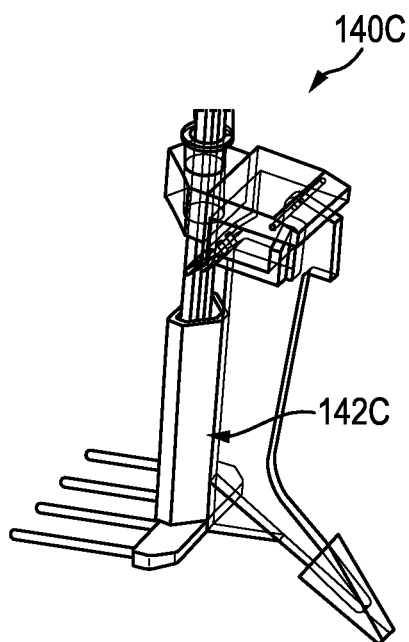
FIG. 4C is a perspective view diagram of an exemplary soil ripper cable delivery device for subsoil delivery of four spaced apart cables according to an embodiment.

Variations to the exemplary subsoil intertwiner 120 configuration can be implemented to achieve different cable network structures having particular protective properties. For example, as shown in FIGS. 4B-4C the rippers can be configured to include systems for multi-cable delivery, rather than a single cable delivery configuration shown in FIG. 4A. For example, FIG. 4B is a perspective view diagram of an exemplary soil ripper cable delivery device 140b configured for subsoil delivery of four grouped cables, wherein the guide 142b is configured to feed out the group of four cables at the same depth underground and in a side-by-side arrangement. By way of further example, FIG. 4C is a perspective view diagram of an exemplary soil ripper cable delivery device 142c, wherein the guide 142c is configured to feed out the four cables at the same depth but spaced apart in the width-wise direction.

Figure 3A:
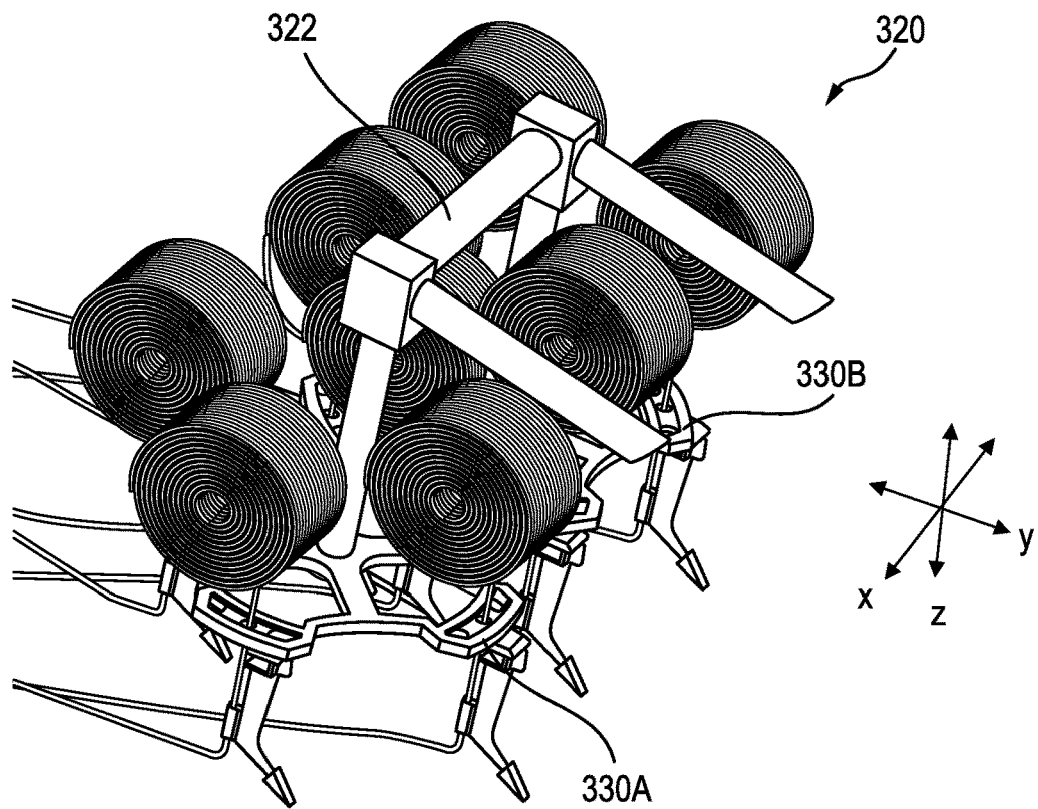
FIG. 3A is a perspective view diagram of an exemplary apparatus for subsurface cable insertion according to an embodiment.
Figure 3B:
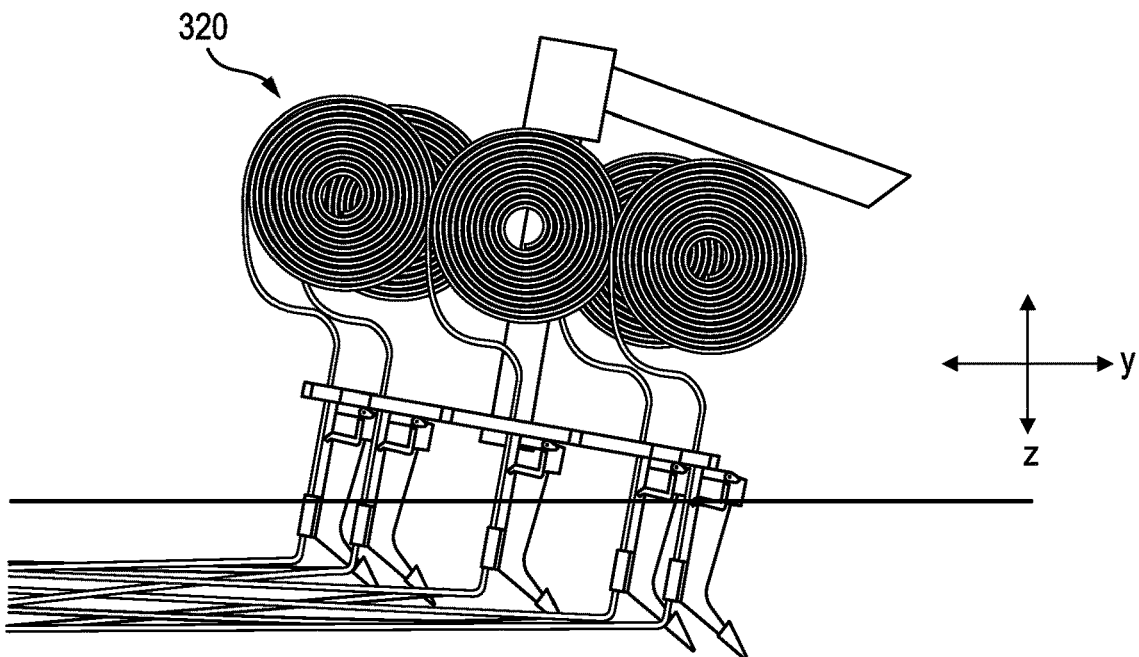
FIG. 3B is a side view diagram of the exemplary apparatus for subsurface cable insertion of FIG. 4A.
Figure 3C:
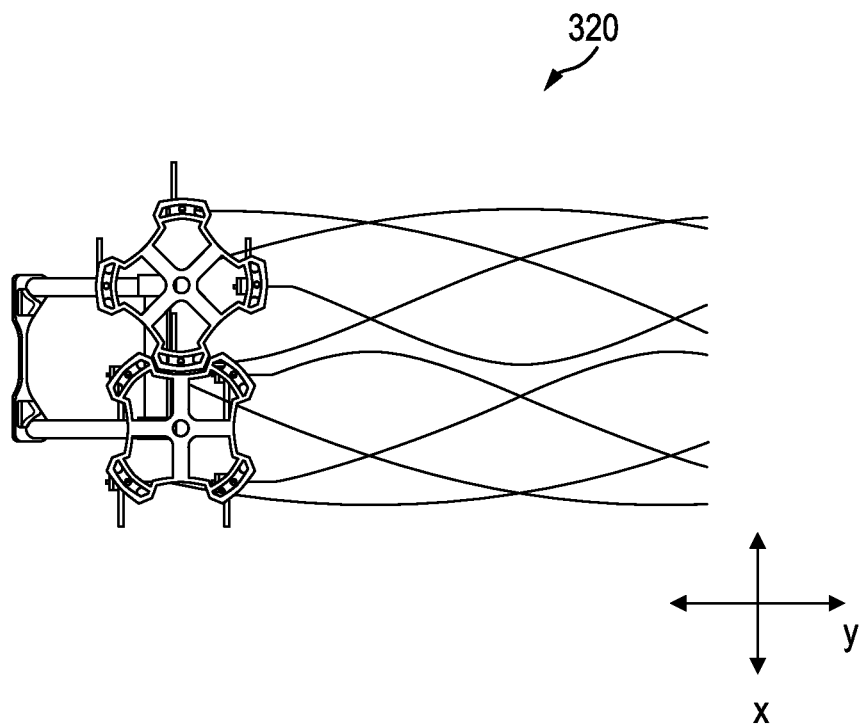
FIG. 3C is a top view diagram of the exemplary apparatus for subsurface cable insertion of FIG. 4A.
Figure 3D:
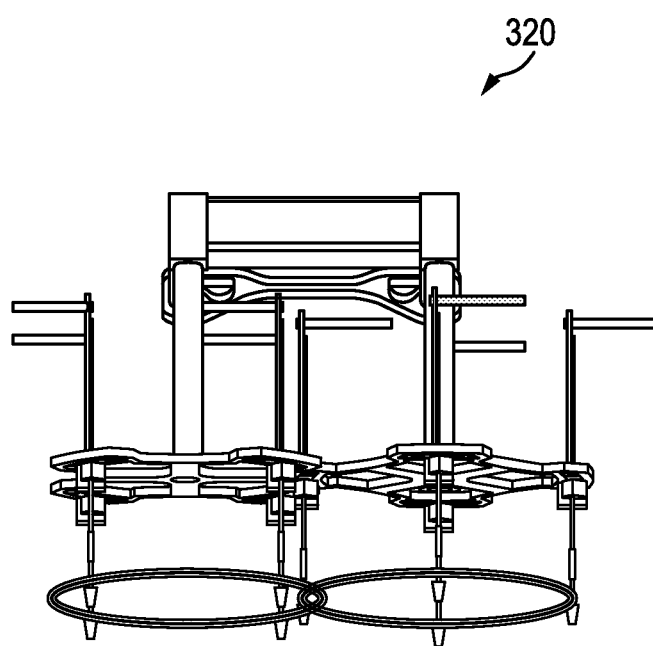
FIG. 3D is a front view diagram of the exemplary apparatus for subsurface cable insertion of FIG. 4A.

Other possible variations to the basic subsoil intertwiner configuration can include combining multiple rotating subsoil intertwiners to provide a wider and more complex intertwined cable structure. For example, FIG. 3A is a perspective view diagram of an exemplary apparatus for subsurface cable insertion 320 according to an embodiment that includes two counter-rotating carriers 330a and 330b. FIG. 3B is a side view diagram of the exemplary apparatus for subsurface cable insertion of FIG. 3A. FIG. 3C is a top view diagram and FIG. 3D is a bottom-front perspective view diagram of the exemplary apparatus for subsurface cable insertion of FIG. 3A, wherein the cable spools have been omitted. As shown in FIGS. 3A-3D, the double-counter-rotating delivery device 320 comprises two of the subsoil delivery devices described above that are arranged side-by-side. The two subsoil delivery devices can be linked, for instance, supported by the same chassis structure 322. Additionally, the two subsoil delivery devices can be driven by one or more power transmission units such that they are configured to counter rotate in sync.

As noted, in operation, the combination of the vehicle movement in the direction of travel and the rotation of the rotating carrier while feeding out the cables via the rippers 140 provides an underground pattern of intertwined cables. Furthermore, the axis of rotation for the rotating shaft (penetration angle, p) can be varied from the vertical axis, v, which allows the cables to entangle and facilitates the sub-surface deployment of an intertwined network of cables, as further described below in connection with FIG. 5A.

Furthermore, it can be appreciated that the configuration of the subsoil intertwiner(s) and other operating parameters, such as the rate at which the cables are laid, penetration angle and rotation speed, can be defined to achieve different protective cable network configurations, cable density and other protective structure features. As would be understood, these parameters can be set prior to operation of the system and/or dynamically adjusted during operation. As would be understood, computer, electronic and/or mechanical control systems can also be used to set and adjust the operating parameters of the system 100.

For instance, the system 100 can include a control computer (not shown) that interfaces with other electronic and electro-mechanical devices (not shown) that facilitate coordinated operation of the subsoil intertwiner 120 and the vehicle 105. The control unit can be any suitable computing device and can include a power source (e.g., battery) a processor, a user interface (e.g., a display and user input devices like keyboards, touchscreen interface and other such input devices), a non-transitory computer readable storage medium such as computer memory or a computer hard drive. The control unit can also include instructions in the form of software code stored in the storage medium and that is executable by the processor. The instructions, when executed by the processor, can configure the control unit to control the operation of the subsoil intertwiner and vehicle by processing sensed data, processing stored instructions, and/or processing control instruction received from a system operator either prior to or during operation of the system. The control unit further include various analog and digital input and output connections that enable the control unit to interface with other electronic devices that facilitate operation of the subsoil intertwiner and/or the vehicle. For example, the other electronic components can include position sensors for measuring the orientation, angle, acceleration, rotational speed and/or position of the rotating carriage 130. The control unit can also interface with the vehicle power transmission unit to control the speed of the rotation of the carriage as well as the speed of the vehicle in the direction of travel. The control unit can also interface with the cable feeding devices to control the speed at which the cables are fed out underground as a function of the speed of vehicle and rotational speed of the carriage.

Features and functionality of the exemplary underground asset protection systems comprising the protective network of intertwined high-strength polymer cables and the methods for creating such protection systems using the exemplary embodiments of the subsoil intertwiner apparatuses will be further appreciated in view of the following discussion of the exemplary cable networks illustrated in FIGS. 5A-7B and with continued reference to FIGS. 1-4C.

Figure 5A:
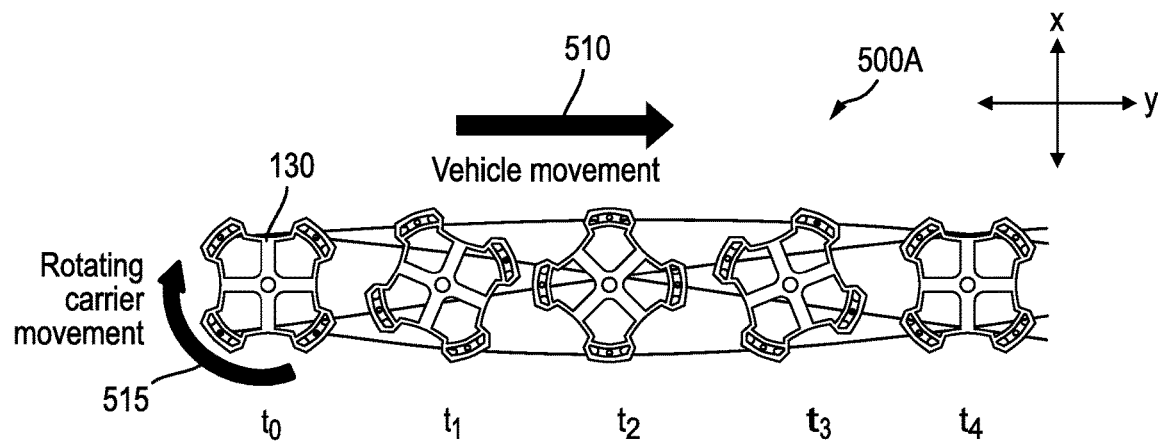
FIG. 5A is a schematic diagram showing an exemplary configuration of intertwined cables delivered into the ground according to an embodiment.
Figure 5B:
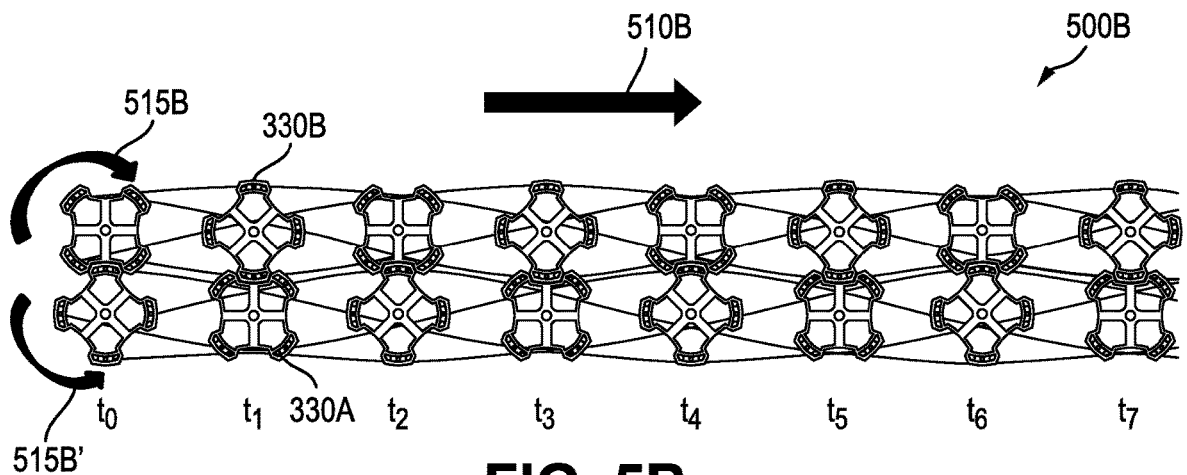
FIG. 5B is a schematic diagram showing an exemplary configuration of intertwined cables delivered into the ground according to an embodiment.
Figure 5C:
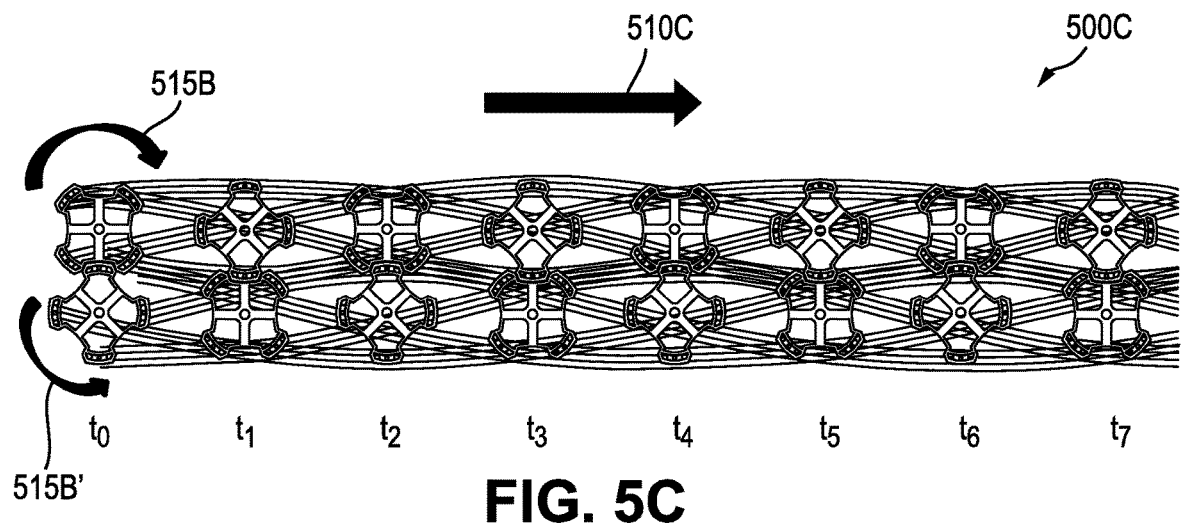
FIG. 5C is a schematic diagram showing an exemplary configuration of intertwined cables delivered into the ground according to an embodiment.

FIG. 5A is a conceptual top-view illustration of the subsurface cable network 500A resulting from the combined vehicle movement in the direction of travel 510 and rotational movement 515 of the single rotating carrier 130 of the subsoil intertwiner 120 described in connection with FIGS. 1A-2C. FIG. 5A shows the rotational position of the carrier 130 and location of the four cables deployed by respective rippers (not shown) at time intervals t0-t4. FIG. 5B is a similar conceptual illustration of the subsurface cable network 500B resulting from the combined vehicle movement in the direction of travel 510B and counter rotational movement 515B and 515B' of the two carriers 330B and 330A of the exemplary subsoil intertwiner 320 shown and described in connection with FIGS. 3A-3D. FIG. 5A also shows the rotational position of the carriers and location of the cables deployed by respective rippers (not shown) at time intervals t0-t7. FIG. 5C is a similar conceptual illustration of the subsurface cable network 500B resulting from the combined vehicle movement in the direction of travel 510C and counter rotational movement 515C and 515C' of the two carriers 330B and 330A of the exemplary subsoil intertwiner 320 shown and described in connection with FIGS. 3A-3D, but modified to include rippers each configured for subsoil delivery of four cables each, as shown and described in connection with FIG. 4B or FIG. 4C.

The establishment of an underground protective cables network having a prescribed density, entanglement and space between cables can be controlled by setting of one or more of a variety of parameters. The density of the underground weaving configuration of the cable network, for example, can be defined by subsoil intertwiner configuration parameters, and dynamic operational parameters. Configuration parameters can include, for example: the number and rotating carrier(s); the diameter of the rotating carrier(s); penetration angle (p), which can define the path of the rippers in one or more of the x-y and z directions; number of soil rippers; number of high strength cables per soil ripper and, where multiple cables are fed out by a ripper, the spacing of the cables in one or more directions; and the radial position of the soil rippers on the rotating carrier relative to the rotational axis, which defines the spacing of the soil rippers in one or more directions (e.g., x and y). Dynamic operational parameters can include, for example: speed of the vehicle towing the subsurface delivery system; and rotation speed of the rotating carrier.

Figure 6:
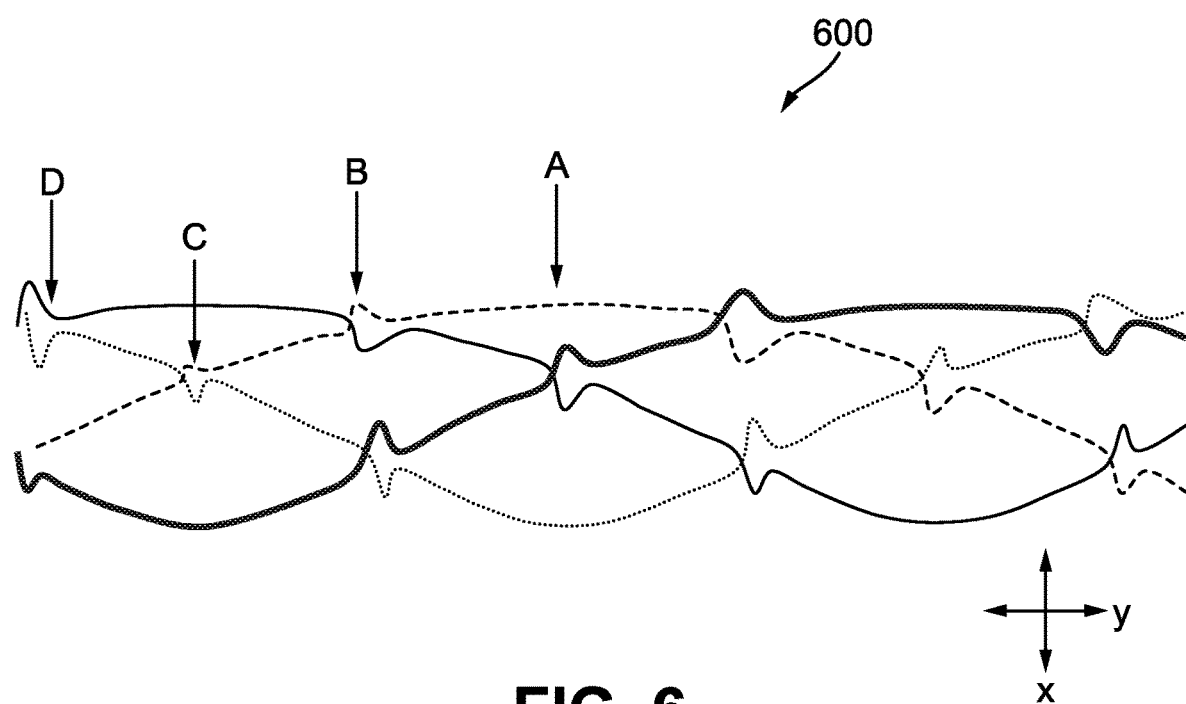
FIG. 6 is a schematic diagram illustrating the protective function provided by an exemplary configuration of intertwined cables according to an embodiment.

FIG. 6 provides a two-dimensional top-view illustration of a network of cables 600 laid, for example, using the four-cable, single rotative carrier configuration shown and described in connection with FIGS. 1A-2C and shown in FIG. 5A. FIG. 6 conceptually illustrates the entanglement points within the deployed network in practice. As shown, a vertical pressure at point A will translate into a vertical opposite reaction force and an increase friction force at point B and point C.

The underground network presents numerous points of entanglement, which means that each motion imposed to one cable, will cause this cable to get in contact with another cable located underneath the first cable. The second will provide a reaction force (vertical and tangential due to increased friction force). as which will be transferred to the first cable and ultimately to the excavator bucket. As can be appreciated, when used as a protective barrier, the effort exerted by an excavator on one protection cable has the effect of moving the cable and resistance from the friction of the cable surface while the soil opposes this movement. In order to further assist in limiting the horizontal motion of a cable, cables can also be anchored at their respective extremities.

Figure 7A:
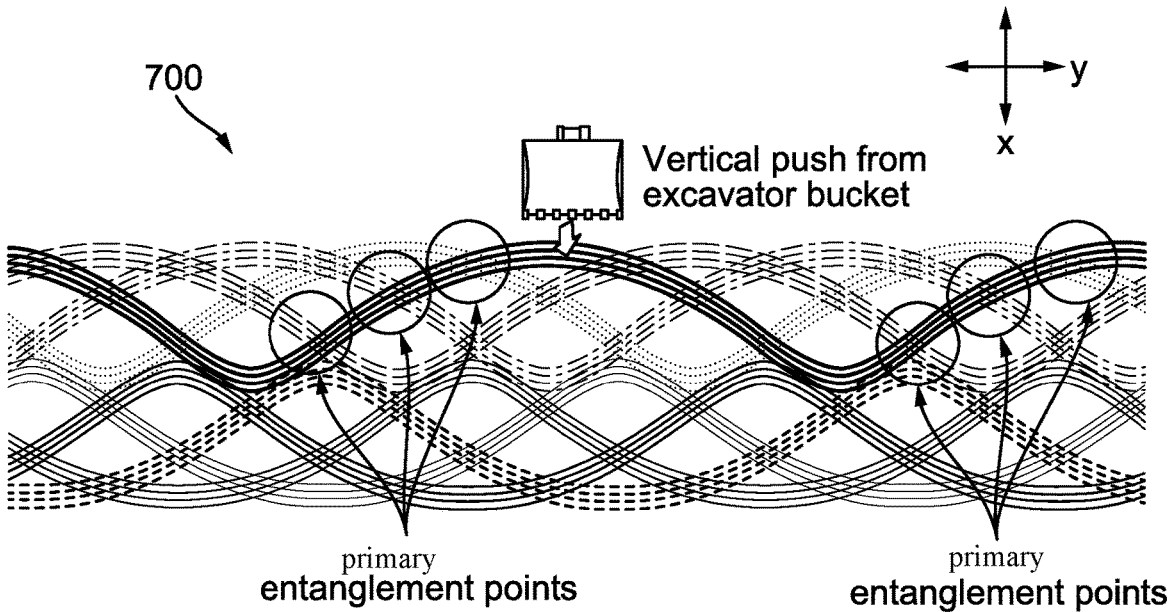
FIG. 7A is a schematic diagram illustrating the protective function provided by an exemplary configuration of intertwined cables according to an embodiment.
Figure 7B:
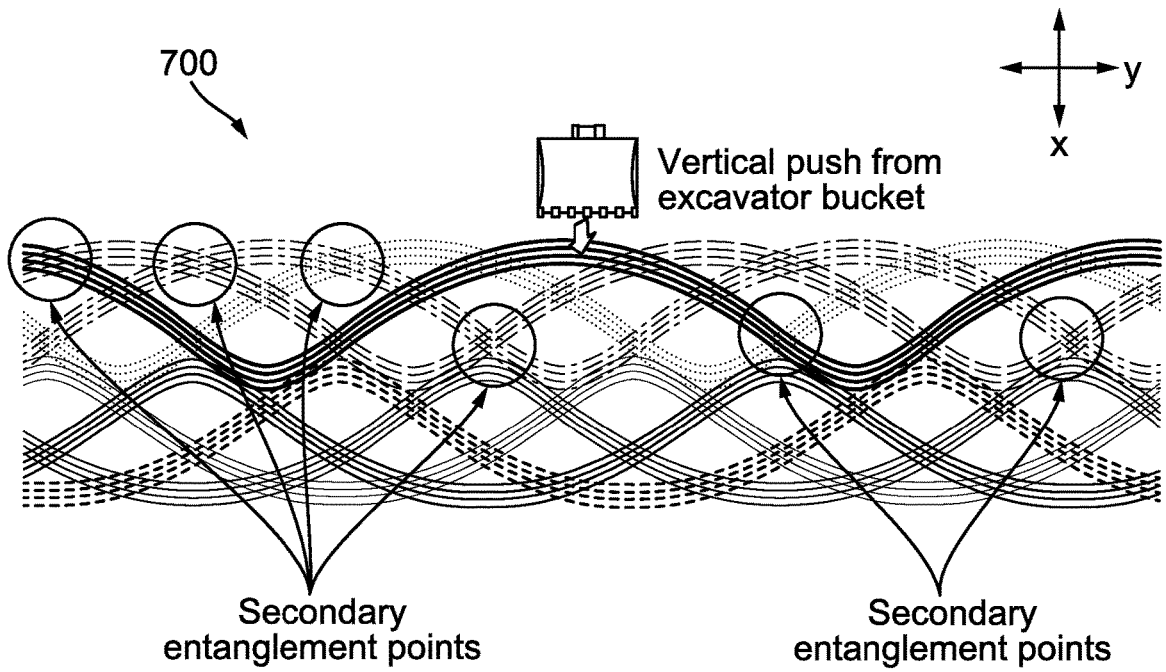
FIG. 7B is a schematic diagram illustrating the protective function provided by an exemplary configuration of intertwined cables according to an embodiment.

FIGS. 7A and 7B similarly illustrate the entanglement points between cables within an exemplary network of cables 700 that is similar to the network shown in FIG. 5C. FIG. 7A illustrates, for example, primary entanglement points (circled) within the network 700 that are stressed when a vertical pushing force from an excavator bucket is applied on the network at the location identified by the arrow. FIG. 7B illustrates, for example, secondary entanglement points (circled) within the network 700 that are stressed when a vertical pushing force from an excavator bucket is applied on the network at the location identified by the arrow. It is thus expected that loading a cable of the network will lead to some deformation of the cable network, however the reaction force to this deformation increases exponentially as the number of entanglement points that are activated increases. As a result, the greater the penetration force of the digger bucket, the larger the reaction force provided by the network. As can be appreciated, the protection provided by a network increases as a function of the density of the network. However, in practice and depending on the application requirements, increasing the density of the network is not always necessary or worthwhile. In many applications, the effect of entanglement of even a relatively lower density cable network can often provide suitable protection for buried assets. Moreover, a higher density network requires more cabling and a subsoil delivery system with many more rippers can result in a lower execution time and require more energy to rip the ground. Accordingly, the exemplary embodiments described herein provide systems and methods for subsurface delivery of a protective cable network that can be adapted to suit the specific requirements of the application (e.g., desired protective properties of the network) in view of practical limitations and costs.

As noted, various parameters and mathematical relationships define the respective positions of the cables deployed using the exemplary systems and the resulting protective cable network. More specifically, the underground position of each cable is driven by the trajectory of the corresponding cutter and the trajectory of each cutter depends on:

a=radius of rotating carrier (e.g. 0.8 m)
b=rotation speed of the carrier (e.g. 0.25 rad/s)
c=speed of the truck (e.g. 0.5 m/s)
d=Y coordinate of carrier's center (e.g. 0.8 m)
e=maximum vertical distance between cables (e.g. 0.15 m). tis parameter is driven by the angle of the rotating shaft with the vertical axis.
f=average depth for cables installation (e.g. −0.5 m)
$\varphi_1$, $\varphi_2$ and $\varphi_3$=constants defining the angular position of one cutter with respect to the rotating carrier center, at $t_0$.

The resulting 3D parametric equation for one cable is expressed as:

$$X = a^* \cos(b^* t + \varphi_1) + c^* t$$

$$f(X,Y,Z) = Y = d + a^* \sin(b^* t + \varphi_2)$$

$$Z = -e^* \sin(b^* t + \varphi_3) + f$$

Extending this example to model the location of two intertwining cables deployed using one rotative carrier where the respective rippers are spaced apart 180 degrees on the single carrier, the position of cable 1 and 2 are expressed by the following sets of equations.

Cable 1

$$X = 0.8^* \cos(0.25^* t - pi/4) - 0.5^* t$$

$$Y = 0.8 + 0.8^* \sin(0.25^* t - pi/4)$$

$$Z = -0.15^* \sin(0.25^* t + pi/4)$$

Cable 2

$$X = 0.8^* \cos(0.25^* t + 3^* pi/4) - 0.5^* t$$

$$Y = 0.8 + 0.8^* \sin(0.25^* t + 3^* pi/4)$$

$$Z = -0.15^* \sin(0.25^* t + 5^* pi/4)$$

Figure 8A:
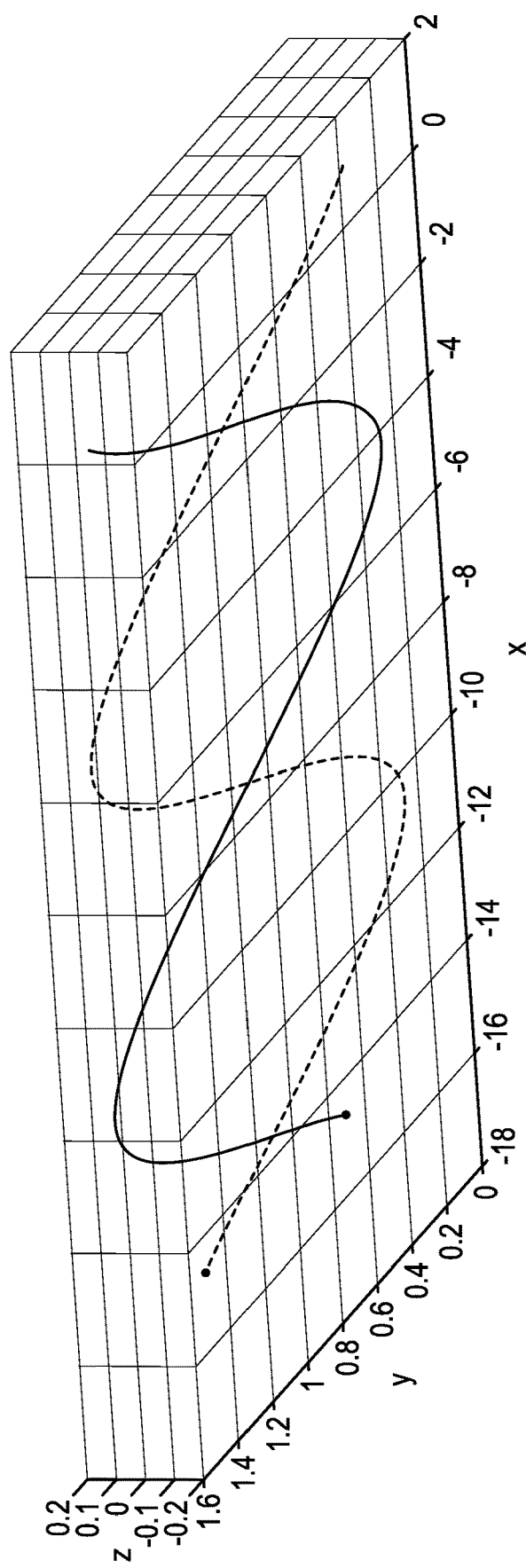
FIGS. 8A-8B are charts graphically illustrating the respective position of cables within a cable network deployed using an exemplary set of system parameters according to an embodiment.
Figure 8B:
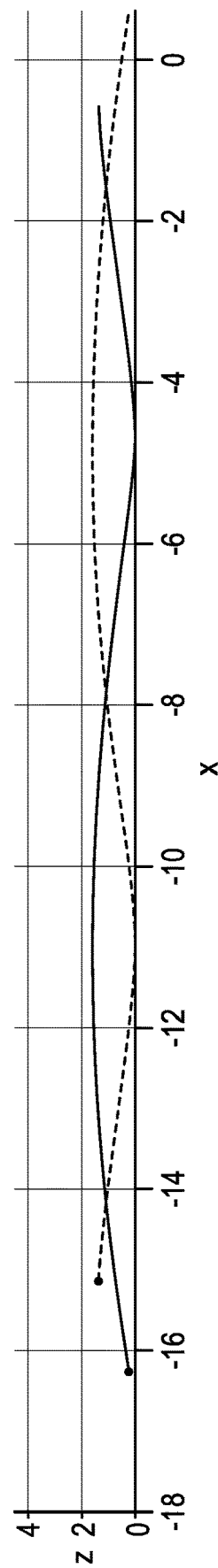

FIG. 8A is a chart graphically illustrating the respective position of exemplary cables 1 and 2 in the x, y and z axis, as deployed according to the aforementioned parameters. FIG. 8B is a chart graphically illustrating the position of exemplary cables 1 and 2 in z axis (i.e., depth), as deployed according to the aforementioned parameters.

Figure 9A:
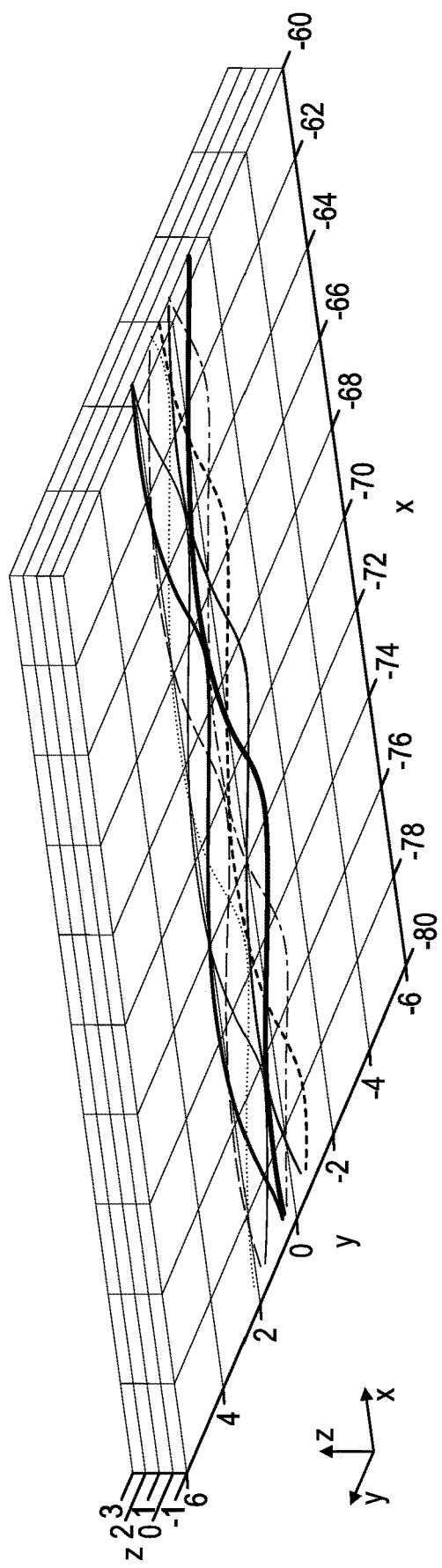

FIGS. 9A-9C are charts graphically illustrating the respective position of cables within an exemplary cable network formed using a two rotating carrier system in which both carriers are rotated in the same rotational direction and wherein each carrier supports four evenly spaced cable-deploying rippers. In this particular example, carriers 1 and 2 are operated according to the following parameters: Carrier 1 (a=0.8 m; b=0.25 rad/s; c=0.5 m/s; d=0.8 m; e=0.15 m; f=−0.5 m) and Carrier 2 (a=0.8 m; b=0.25 rad/s; c=0.5 m/s; d=0.8 m; e=0.15 m; f=−0.5 m). FIG. 9A is a chart graphically illustrating the respective position of the eight cables, in the x, y and z axis, as deployed according to the aforementioned parameters. FIG. 9B is a chart graphically illustrating the position of the cables in the x-y axis, as deployed according to the aforementioned parameters. FIG. 9C is a chart graphically illustrating the position of the cables in the z axis (i.e., depth), as deployed according to the aforementioned parameters.

Figure 10A:
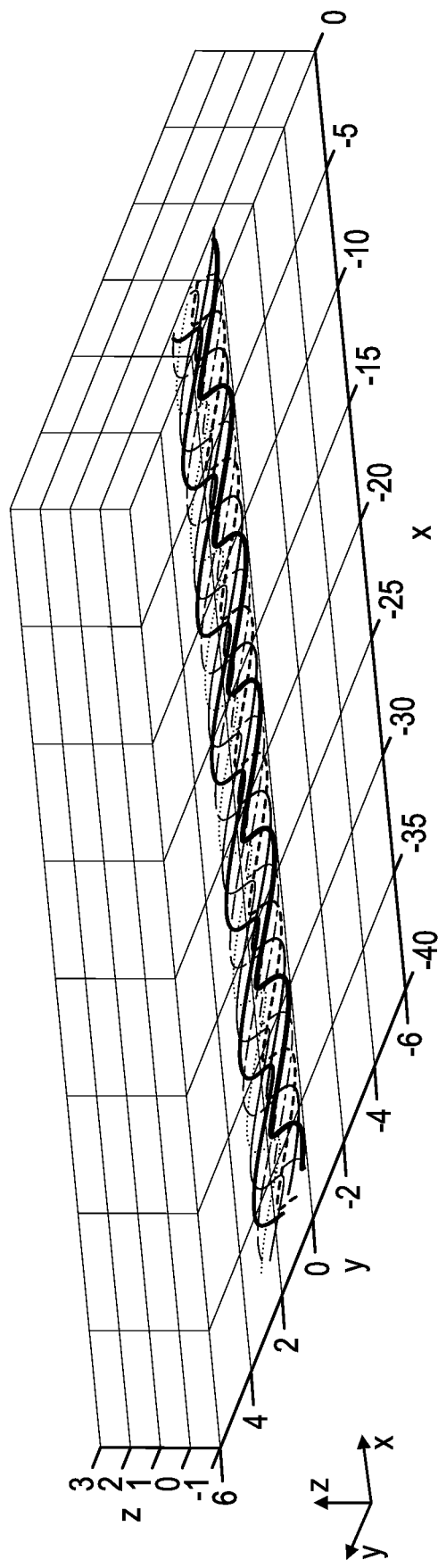
FIGS. 10A-10C are charts graphically illustrating the respective position of cables within a cable network deployed using an exemplary set of system parameters according to an embodiment.
Figure 10B:
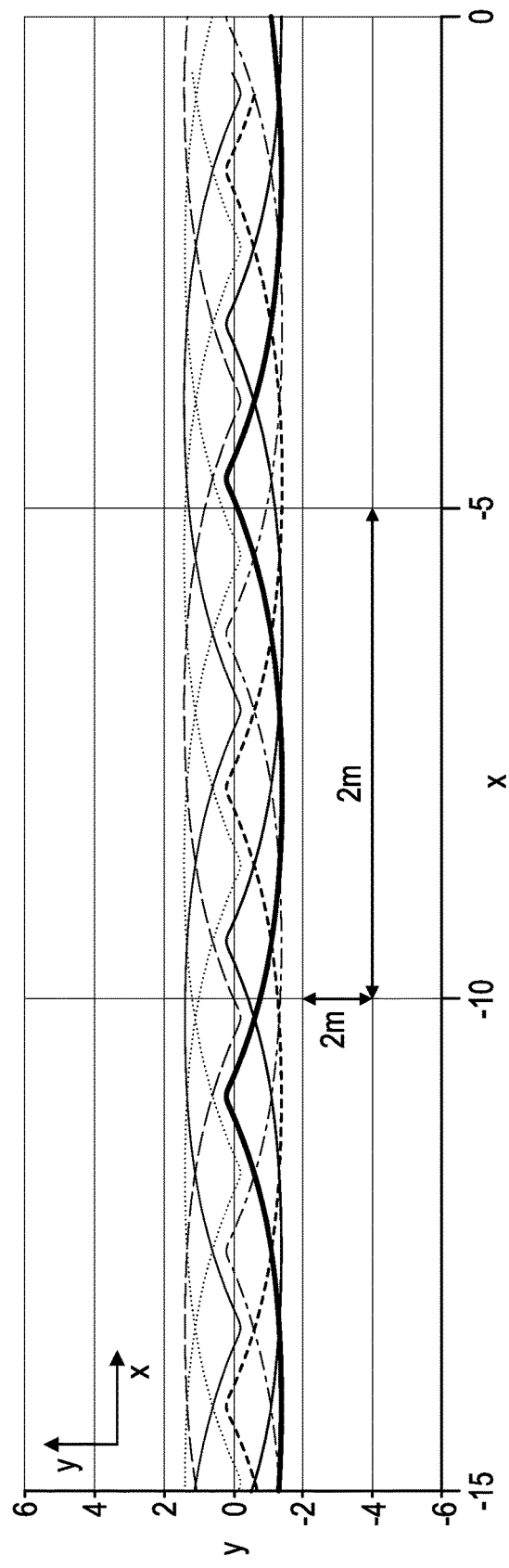
Figure 10C:
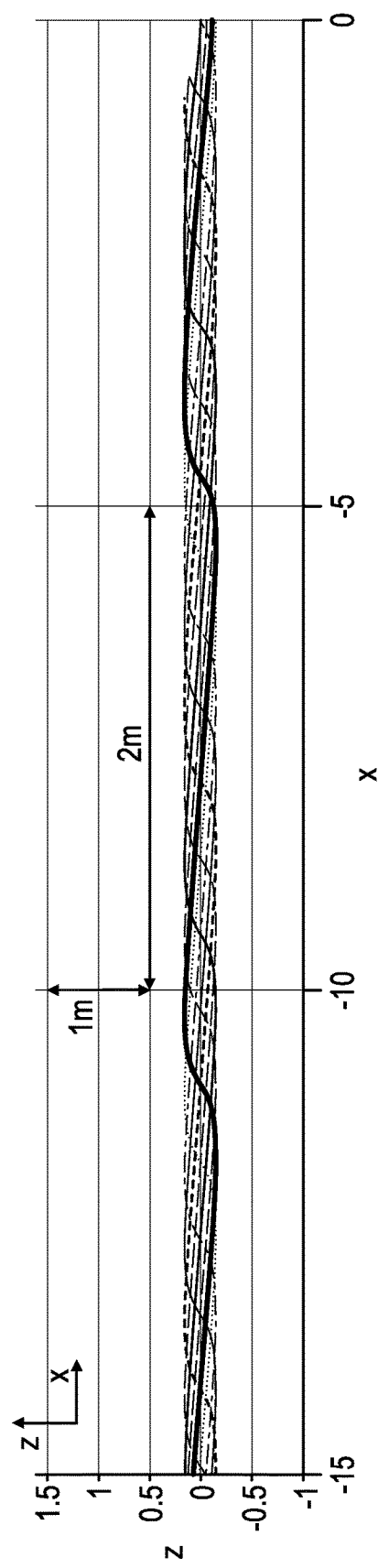

FIGS. 10A-10C are charts graphically illustrating the respective position of cables within an exemplary cable network formed using a two rotating carrier system in which the carriers are counter-rotated and wherein each carrier supports four evenly spaced cable-deploying rippers. In this particular example, carriers 1 and 2 are operated according to the following parameters: Carrier 1 (a=0.8 m; b=0.25 rad/s; c=0.25 m/s; d=0.6 m; e=0.15 m; f=−0.5 m) and Carrier 2 (a=0.8 m; b=−0.25 rad/s; c=0.25 m/s; d=−0.6 m; e=0.15 m; f=−0.5 m). FIG. 10A is a chart graphically illustrating the respective position of the eight cables, in the x, y and z axis, as deployed according to the aforementioned parameters. FIG. 10B is a chart graphically illustrating the position of the cables in the x-y axis, as deployed according to the aforementioned parameters. FIG. 10C is a chart graphically illustrating the position of the cables in the z axis (i.e., depth), as deployed according to the aforementioned parameters.

The example simulations described above in connection with FIGS. 8A-10C, illustrate that the parametric function f(X,Y,Z) is usable to model the network pattern as a function of various device configuration and operational speed parameters. It can be further appreciated that the controllable variables allow for adjusting the cable pattern to the desired functionality. For instance, a lower vehicle speed, c, results in a denser underground network. See for example, the example illustrated in FIGS. 9A-9C (c=0.5 m/s) versus the example illustrated in FIGS. 10A-10C (c=0.25 m/s). Additionally, an interlocking rotative carrier, as shown in FIG. 8A, allows to reduce parameter d, increasing the density of the network, while narrowing the width of the protection network. It can be further appreciated that counter rotative carriers allow to define a quasi-symmetric pattern (see e.g., FIGS. 10A-10C).

According to a further aspect, additional features and steps are incorporated into the exemplary systems to improve the entanglement of the cable network. For instance, in one exemplary configuration, the reinforced cables are provided with elongate barbs positioned all along and all around the cables. More particularly, a plurality of elongate barbs can provided along the length of the reinforced cable body and such that they extend from the cable body to a respective free end in both a lengthwise direction, along the length of the cable, and radially away from the cable body. The barbs are also preferably spaced apart in the lengthwise direction along the length of the cable body and/or circumferentially about the cable body.

Barbs are, in some configurations, machined into the cable, for example, by notching (i.e., cutting) the cable jacket or sheath using a cutting tool. In addition or alternatively, barbs are applied to the surface of the cable so as to avoid cutting the cable jacket.

Figure 11A:
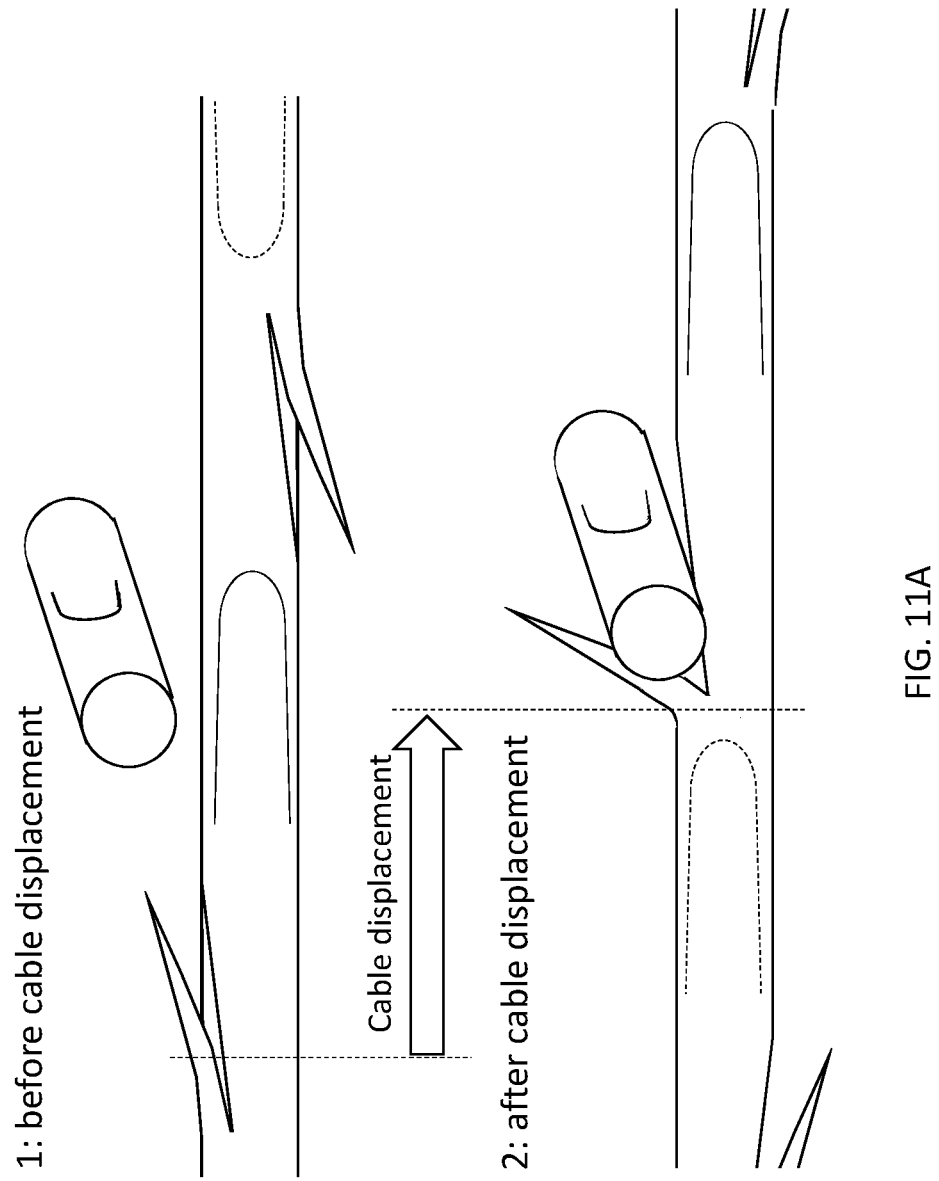
FIG. 11A is a schematic diagram illustrating an exemplary configuration of cables according to an embodiment.

FIG. 11A includes two conceptual diagrams illustrating a perspective side-view of a portion of a deployed cable network 1100 before cable displacement (see top diagram, numbered 1) and after cable displacement (see bottom diagram, numbered 2). As shown, the cable network comprises a first cable 1110 and a transversely oriented cable 1120. As shown, the segment of cable 1110 includes barbs 1115A-1115D spaced apart along the length of the cable 1110 and cable 1120 similarly includes a barb 1125A. The barbs facilitate 1) the ability to anchor each cable in the soil by providing more resistance against sliding of cables in the soil; 2) as different cables cross with a small distance in the z-direction, barbs help multiple cables to be entrained when one or several cables are moved due to for example the force from a digger jaw. The bottom diagram of FIG. 11A, shows the entangled state of the cables after displacement of the network, say, by earth-working equipment and the bottom diagram (labeled 2), in which cable 820 is entangled with cable 1 at a first barb 815A. As can be appreciated, the entanglement of the network as well as its anchorage in the soil can thus be considerably improved with barbs and, as a consequence, improves resistance against penetration of the network by civil work.

Figure 11B:
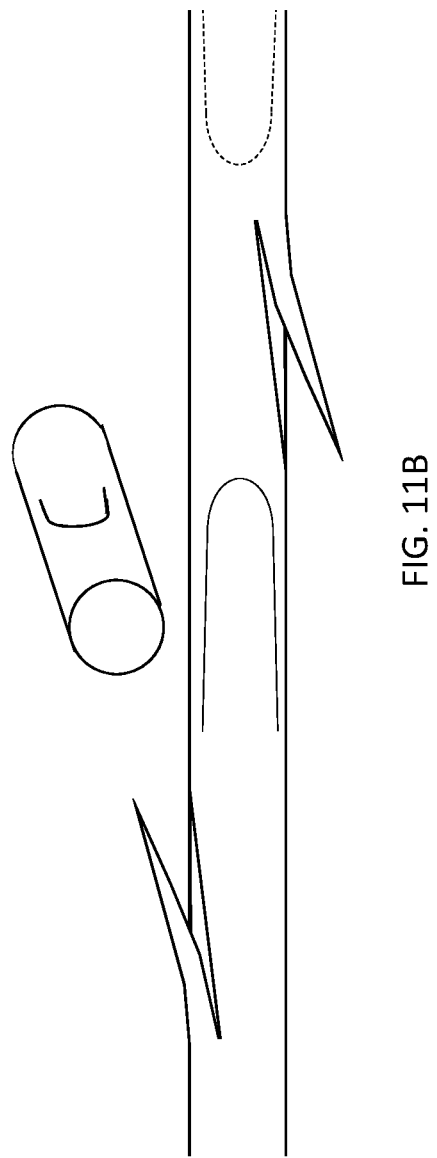
FIG. 11B is a schematic diagram illustrating an exemplary configuration of cables according to an embodiment.

Whereas FIG. 11A shows barbs oriented generally in the same lengthwise direction along the length of the cable, in addition or alternatively, the reinforced cables can have barbs oriented in different, e.g., opposite, directions. FIG. 11B is a diagram showing a perspective side-view of a portion of an exemplary cable network 1150. The network comprises a first cable 1160 and a transversely oriented cable 1170. As shown, the segment of cable 1160 includes barbs 1165A-D that are spaced apart along the length of the cable and spaced apart circumferentially, wherein barbs 1165A and 1165B are oriented in a first linear direction and barbs 1165C and 1165D are oriented in the opposite direction. The opposing orientation of the barbs can facilitate a symmetrical entanglement behavior for the cable.

Preferably, to facilitate the capture adjacent cables or otherwise increasing the friction provided between the cable and the surrounding earth, barbs are at least multiple times longer than the cable diameter. Moreover, in order to avoid decreasing cable strength too much, the radial depth of barbs cut into the sheath of the cable is preferably limited relative to the total cable diameter, for instance, the depth of the cut that defines the barbs can be limited such that it does not exceed one fifth of the total cable diameter. In addition or alternatively, the depth of cut can be limited such that it does not exceed one sixth of the total cable diameter.

According to one or more embodiments, barbs are formed from cutting the cable structure, preferably in a manner that maintains at least a minimum level of structural integrity. Such barbs are machined or attached to the cable during the cable manufacture process and, in addition or alternatively, during the cable deployment step. Additionally, or other cable surface features, for instance texturing or surface scarring, can similarly be added to the cables.

Figure 12:
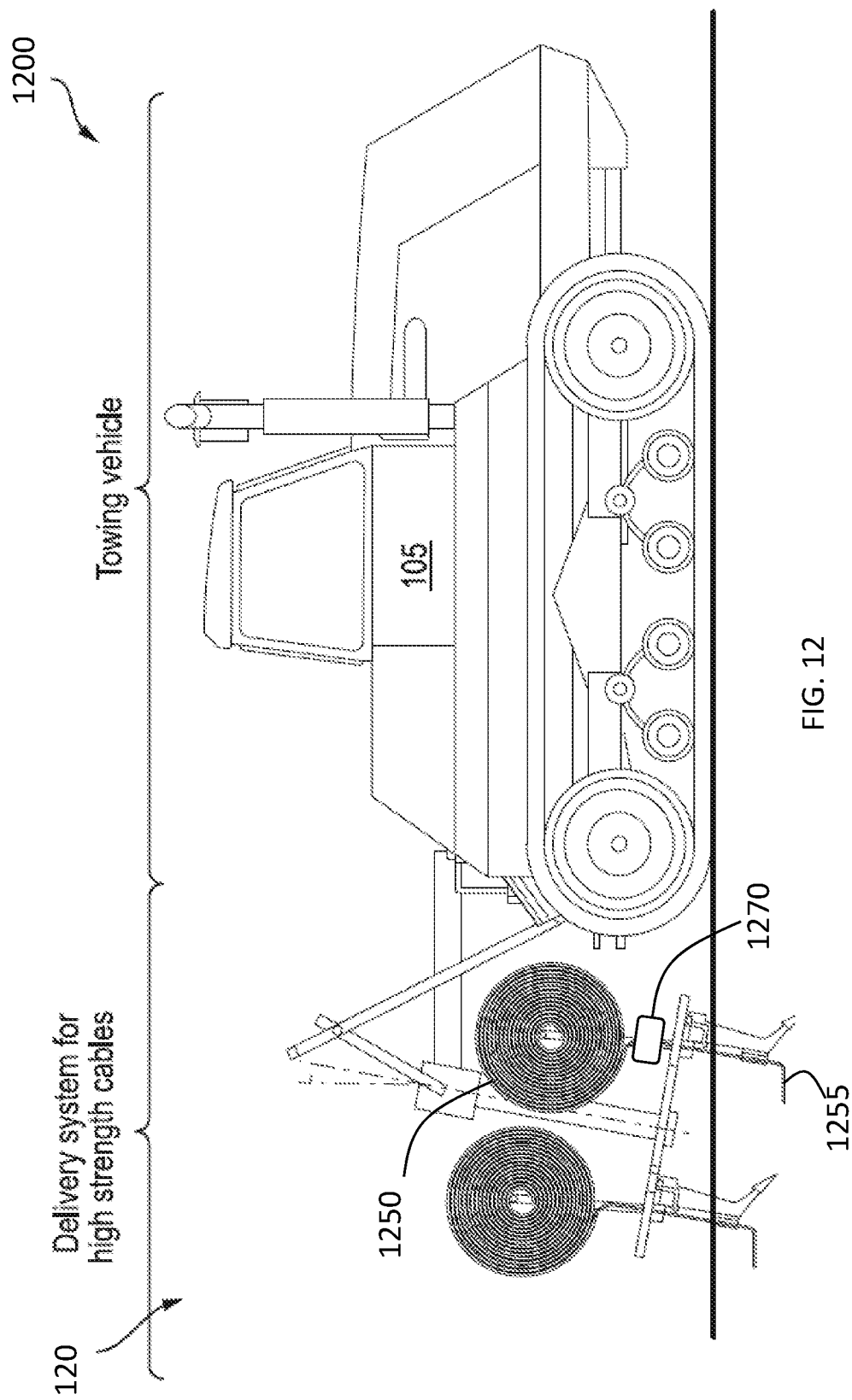
FIG. 12 is a high-level diagram illustrating an exemplary configuration of a subsurface cable insertion system for protecting buried infrastructures according to an embodiment.

For example, FIG. 12 is a high-level diagram illustrating an exemplary configuration of a subsurface cable insertion system 1200 configured to deliver a protective network of intertwined cables according to an embodiment. As shown, the system includes a subsoil intertwiner 1220 that is complemented with a barb-application device 1270 positioned between the spool carrier 1250 and the ripper 1240 for sub-surface deployment of the cable 1255. The barb-application device is configured to automatically apply the barb-features on the cable 1255 as it is being deployed. In particular, the barb-application device 1270 can be configured to provide each barb at one or more of a prescribed lengthwise spacing and a prescribed circumferential spacing from the preceding barb and with a prescribed barb orientation (e.g., forward/backward orientation).

For instance, in one exemplary configuration, the elongate reinforced polymer cable body is provided from a cable spool and continuously fed out for subsurface deployment. The barb-application device 1270 can be configured to wrap barbed tape around each cable with controlled spacing and barb orientation. In another exemplary configuration, the barb-application device 1270 is configured to affix cable ties around the cable with controlled spacing and barb orientation. By way of a further example, the barb-application device 1270 can include cutting devices configured to provide the barbs by notching (i.e., cutting) the outer sheath of the cable at a precise depth and location along the cable length and at a prescribed orientation. As a result, the barb comprises the portion of the sheath (e.g., the elongate flap) defined by the notch. In addition or alternatively, the barb-application device 1270 can similarly be configured to give the cable surface a scarred texture and increase friction between the cable and soil.

As noted, these operations for applying entanglement enhancing features like barbs and surface texture to the cables can be performed during the subsoiling operation or it can be done during cable manufacturing. However, it can be preferable to modify cables during the subsoiling operation, as this will prevent complications during spooling the cables such as tangling.

At this juncture, it should be noted that although much of the foregoing description has been directed subsurface cable delivery systems and methods for protecting buried assets, the systems and methods disclosed herein can be similarly deployed and/or implemented in scenarios, situations, and settings far beyond the referenced scenario for protecting buried assets.

It is to be understood that like numerals in the drawings represent like elements through the several figures, and that not all components and/or steps described and illustrated with reference to the figures are required for all embodiments or arrangements.

The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s). It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A cable apparatus for use in a protective network of intertwined cables provided beneath a surface of ground, the cable apparatus comprising:
    an elongate reinforced polymer cable body having a length;
    a plurality of elongate barbs provided along the length of the cable body, wherein the barbs extend from the cable body to a respective free end in both a lengthwise direction and radially and wherein the barbs are spaced apart in one or more of the lengthwise direction along the length of the cable body and circumferentially about the cable body, wherein each of the barbs generally extends in one of a first lengthwise direction and a second lengthwise direction which is opposite to the first lengthwise direction.

2. The cable apparatus of claim 1, wherein two consecutive barbs along the length of the cable body are spaced apart in the lengthwise direction and circumferentially.

3. The cable apparatus of claim 1, wherein two consecutive barbs along the length of the cable body are spaced apart in the lengthwise direction and circumferentially.

4. The cable apparatus of claim 1, wherein the barbs have a length that is multiple times greater than a diameter of the cable.

5. The cable apparatus of claim 1, wherein the barbs are respectively applied to a surface of the cable body.

6. The cable apparatus of claim 1, wherein the barbs are integrally formed with the cable body and are defined by a notch cut into a sheath of the cable body.

7. The cable apparatus of claim 6, wherein the notch begins at a radial depth from the surface that is less than one sixth of a total diameter of the cable.

8. The cable apparatus of claim 6, wherein the notch begins at a radial depth from the surface that is less than one fifth of a total diameter of the cable.

9. A method of constructing a cable apparatus for use in a protective network of intertwined cables provided beneath a surface of ground, the method comprising:
    providing an elongate reinforced polymer cable body having a length;
    providing a plurality of elongate barbs along the length of the cable body, wherein each barb extends from the cable body to a respective free end in a lengthwise direction and radially, and wherein the barbs are provided at respective position such that the barbs are spaced apart in one or more of the lengthwise direction along the length of the cable body and circumferentially about the cable body; and
    continuously feeding out the cable from a cable spool for delivery under the surface of the ground and wherein the step of providing a particular barb on a portion of the cable is performed after the portion of cable is fed out from the spool and prior to delivery under the surface of the ground.

10. The method of claim 9, wherein two consecutive barbs along the length of the cable body are spaced apart in the lengthwise direction and circumferentially.

11. A method of constructing a cable apparatus for use in a protective network of intertwined cables provided beneath a surface of ground, the method comprising:
    providing an elongate reinforced polymer cable body having a length; and
    providing a plurality of elongate barbs along the length of the cable body, wherein each barb extends from the cable body to a respective free end in a lengthwise direction and radially, and wherein the barbs are provided at respective position such that the barbs are spaced apart in one or more of the lengthwise direction along the length of the cable body and circumferentially about the cable body, wherein each of the barbs generally extends in one of a first lengthwise direction and a second lengthwise direction which is opposite to the first lengthwise direction.

12. The method of claim 11, wherein the step of providing the barbs includes: affixing each barb to the surface of the cable body at a respective position.

13. The method of claim 11, wherein the step of providing a respective barb includes: cutting a notch into a sheath of the cable body such that the respective barb comprises a portion of the sheath defined by the notch.

14. The method of claim 13, wherein the notch is cut into the sheath to a radial depth from the surface that is less than one fifth of a total diameter of the cable.

15. A protective cable system provided beneath a surface of ground, the system comprising:
    a plurality of intertwined cables, each cable including:
        an elongate reinforced polymer cable body having a length;
        a plurality of elongate barbs provided along the length of the cable body, wherein the barbs extend from the cable body to a respective free end in both a lengthwise direction and radially and wherein the barbs are spaced apart in one or more of the lengthwise direction along the length of the cable body and circumferentially about the cable body wherein the intertwined cables comprise at least one barb extending in a first direction and at least one barb extending in a different direction as a function of the intertwining.

16. The system of claim 15, wherein the barbs have a length that is multiple times greater than a diameter of the cable.

17. The system of claim 15, wherein the barbs are one or more of: respectively applied to a surface of the cable body and defined by a notch cut into a sheath of the cable body.

18. A protective cable system provided beneath a surface of ground, the system comprising:
- a plurality of intertwined cables, each cable including:
  - an elongate reinforced polymer cable body having a length;
  - a plurality of elongate barbs provided along the length of the cable body, wherein the barbs extend from the cable body to a respective free end in both a lengthwise direction and radially and wherein the barbs are spaced apart in one or more of the lengthwise direction along the length of the cable body and circumferentially about the cable body, wherein each of the barbs generally extends in one of a first lengthwise direction and a second lengthwise direction which is opposite to the first lengthwise direction.

* * * * *